(12) United States Patent
Sironi et al.

(10) Patent No.: US 7,270,353 B2
(45) Date of Patent: Sep. 18, 2007

(54) MULTIPLE TRANSPONDER SEAL DEVICE

(75) Inventors: Marco Sironi, Laveno-Mombello (IT); Piercarlo Tebaldi, Brebbia (IT); Christophe Korn, Ferrera di Varese (IT); Andre Poucet, Cittiglio (IT)

(73) Assignee: The European Community (BE)

( * ) Notice: Subject to any disclaimer, the term of this patent is extended or adjusted under 35 U.S.C. 154(b) by 0 days.

(21) Appl. No.: 10/546,968

(22) PCT Filed: Feb. 16, 2004

(86) PCT No.: PCT/EP2004/050140

§ 371 (c)(1),
(2), (4) Date: Jan. 27, 2006

(87) PCT Pub. No.: WO2004/075102

PCT Pub. Date: Sep. 2, 2004

(65) Prior Publication Data
US 2006/0152366 A1    Jul. 13, 2006

(30) Foreign Application Priority Data
Feb. 24, 2003 (EP) .................................. 03209437

(51) Int. Cl.
  *B65D 27/30* (2006.01)
  *B65D 33/34* (2006.01)
(52) U.S. Cl. .............................. 292/307 R; 390/572.9; 292/327
(58) Field of Classification Search ............ 292/307 R, 292/327 X; 340/572.1, 572.7–572.9; 235/385; 705/22, 28
See application file for complete search history.

(56) References Cited

U.S. PATENT DOCUMENTS

| 4,694,283 | A | * | 9/1987 | Reeb ........................ 340/572.5 |
| 5,291,180 | A | * | 3/1994 | Reeb ........................ 340/572.5 |
| 5,969,595 | A | * | 10/1999 | Schipper et al. ....... 340/426.19 |
| 6,050,622 | A | | 4/2000 | Gustafson |
| 6,222,452 | B1 | * | 4/2001 | Ahlstrom et al. ......... 340/572.1 |

(Continued)

FOREIGN PATENT DOCUMENTS

DE        2615969 A   * 10/1977

(Continued)

OTHER PUBLICATIONS

International Search Report; PCT/EP2004/050140; Jun. 26, 2004.

*Primary Examiner*—Brian E. Glessner
*Assistant Examiner*—Mark Williams
(74) *Attorney, Agent, or Firm*—Cantor Colburn LLP

(57) ABSTRACT

The invention relates to a seal device, including a locking pin and a sleeve, the locking pin having a head and a stem having a groove which interacts with a locking ring disposed in the sleeve to lock the sleeve onto the pin by insertion. The sleeve also includes a first transponder housed in the upper portion of the sleeve at a depth that is greater than the height of the stem and the locking pin also comprises a second transponder disposed on the outer periphery of the stem. Each transponder includes storage means for storing at least one unique identification code. Thus, any unauthorized handling of the seal device may be detected even if the latter is completely replaced after breakage.

12 Claims, 4 Drawing Sheets

U.S. PATENT DOCUMENTS

| | | | |
|---|---|---|---|
| 6,265,973 B1 * | 7/2001 | Brammall et al. | 340/568.1 |
| 6,624,752 B2 * | 9/2003 | Klitsgaard et al. | 340/572.1 |
| 2002/0014955 A1 * | 2/2002 | Klitsgaard | 340/10.42 |
| 2006/0170560 A1 * | 8/2006 | Auerbach et al. | 340/572.9 |
| 2007/0052539 A1 * | 3/2007 | Brown | 340/571 |

FOREIGN PATENT DOCUMENTS

| | | |
|---|---|---|
| DE | 197 09 364 | 9/1998 |
| DE | 299 20 189 | 11/2000 |
| EP | 1 087 334 | 3/2001 |

\* cited by examiner

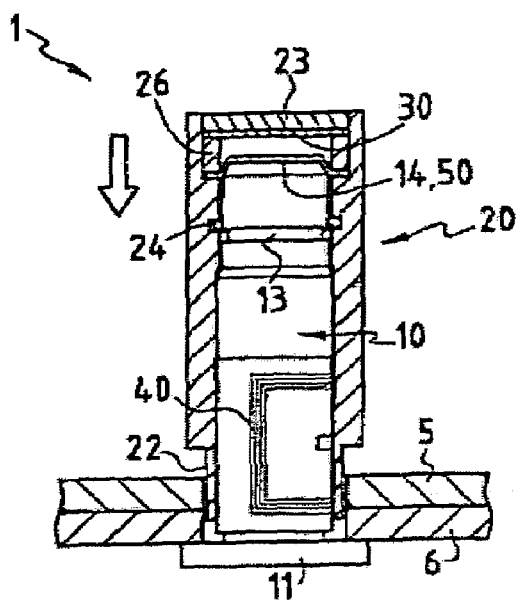
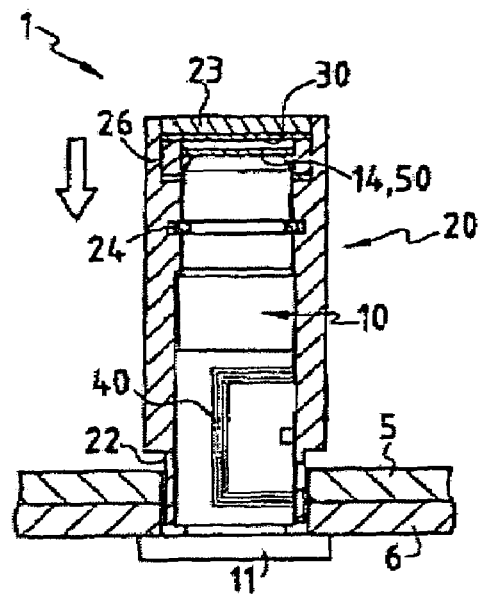
FIG.5A    FIG.5B
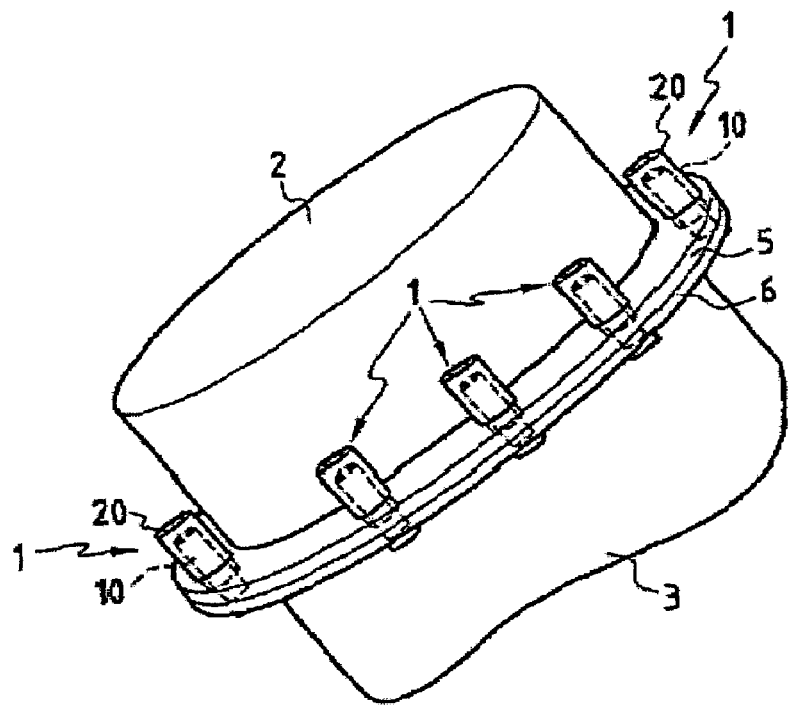
FIG.6

MULTIPLE TRANSPONDER SEAL DEVICE

TECHNICAL FIELD OF THE INVENTION

The present invention relates to a seal device for closing and marking objects. More particularly, the invention relates to the seal devices that use electronic identification means.

BRIEF DESCRIPTION OF RELATED ART

Many types of seals are currently used for inspecting the routing or storage of products or materials that have more or less important security or inspection requirements, such as, for example, freight merchandise of any kind, nuclear materials, certain types of waste or money.

The technologies employed to produce the seals are extremely varied and depend mainly on the usage and degrees of security required.

Thus, when the requirement is simply to check on the integrity of an object, such as a bag or a container, the function of the seal is to guarantee that the object has not been opened without authorization. In this case, low cost devices, such as simple plastic or metal collars affixed to the opening members of the object may be used. A visual inspection of the integrity of the collar structure then suffices to check whether or not the seal has been violated.

On the other hand, there is an increasing number of fields, such as international transport, in which the seals are required not only to fulfill their basic function, which is to be able to certify the inviolability of the object, but also to be able to supply information during and after their transportation. Thus, devices currently exist that comprise mechanical means of sealing with which are associated electronic or optical means that can be used to store and transmit information.

However, the current seal devices that comprise electronic means are complex and costly. They are usually designed for a specific use and cannot be used with just any type of object. In addition, they have a fragile mechanical structure which makes them very sensitive to handling and transportation operations which further restricts their use.

BRIEF SUMMARY OF THE INVENTION

The present invention aims to remedy the aforementioned disadvantages and to produce a low cost multiple use seal device that is mechanically robust and that contains information that can be read simply and quickly. The device must also allow a secure and easy inspection of the integrity of the seal.

These objects are achieved thanks to a seal device, comprising a locking pin and a sleeve, the locking pin comprising a head and a stem comprising a groove which interacts with a locking ring disposed in the sleeve to lock said sleeve onto the pin by insertion, characterized in that the sleeve also comprises a first transponder housed in the upper portion of the sleeve at a depth that is greater than the height of the stem and in that the locking pin also comprises a second transponder disposed on the outer periphery of the stem, each transponder comprising a substrate on which are formed an electronic circuit and an antenna, said electronic circuit comprising storage means for storing at least one unique identification code.

Thus, thanks to the seal device according to the invention, it is possible to mark any object with a unique identity, so that the object can be inspected and monitored during and after its transportation. In addition, the integrity inspection of the seal device is carried out by interrogation of a second transponder, which requires no dismantling of the seal and can be used in any location to inspect the conformity of the identity information contained in the transponder.

According to a particular aspect of the invention, the sleeve also comprises a third transponder held inside the latter at a depth that is less than the height of the stem, the transponder comprising a substrate on which are formed an electronic circuit and an antenna, said electronic circuit comprising storage means for storing at least one unique identification code.

Thanks to this third transponder placed at intermediate depth in the sleeve, it is possible to verify that the device has been correctly installed, that is to say that the sleeve has been correctly locked onto the pin making it impossible to open the object without destroying the seal device.

To ensure a complete destruction of the third transponder when the seal device is installed, it is held in the sleeve by an annular element which covers at least a portion of the antenna of said transponder. Thus, during an interrogation, the absence of a response from the third transponder indicates a correct installation.

The first transponder may contain, in addition to a unique identification code, data relating to the date and location at which the seal device was installed, or information on inspections made on the object during its transportation. The storage means of the first transponder may comprise data encryption means.

A further object of the invention is a system of inspecting and monitoring an object, said object comprising at least one seal device as described above, characterized in that it comprises a signal transmission device to read or write information in the transponders of the seal device, processing means and data storage means for entering the information stored in the transponders.

Thus, thanks to the system of the invention, the installation and integrity of the seal device may be inspected by remote interrogation of the transponders with no handling of the device. In addition, the information stored in the first transponder, with the exception of the identification code, may be consulted and updated in real time. The data storage means of the system can also be used to store important information, such as the identification code, to allow a subsequent comparison with the codes read on the device in order to detect any unauthorized handling of the device.

According to a particular feature, the data storage means can be accessed remotely via a network link. This makes it possible to carry out inspections in any location and at any time by having a reference remotely accessible on the original data associated with the seal device. For example, it is possible to read a code of a transponder during a stage in the transportation of the object marked with the seal device and compare the code read with that originally entered to detect an unauthorized replacement of the seal device.

For this purpose, the processing means may comprise software means for confirming the installation of the seal device by interrogation of the third transponder and/or for detecting an unauthorized handling of the seal device by interrogation of the second transponder. The processing means may also comprise a software means for detecting an unauthorized replacement of the seal device by reading the seal device transponder codes and by comparing said codes with the original codes previously entered in the data storage means.

BRIEF DESCRIPTION OF THE DRAWINGS

Other features and advantages of the invention will emerge from the following description of particular embodiments of the invention, given as nonlimiting examples, with reference to the appended drawings, in which:

FIGS. 5A and 5B show the installation steps of the seal device according to the invention, FIG. 6 is a view in perspective of an exemplary application of the invention.

DETAILED DESCRIPTION OF THE INVENTION

Figure 1:
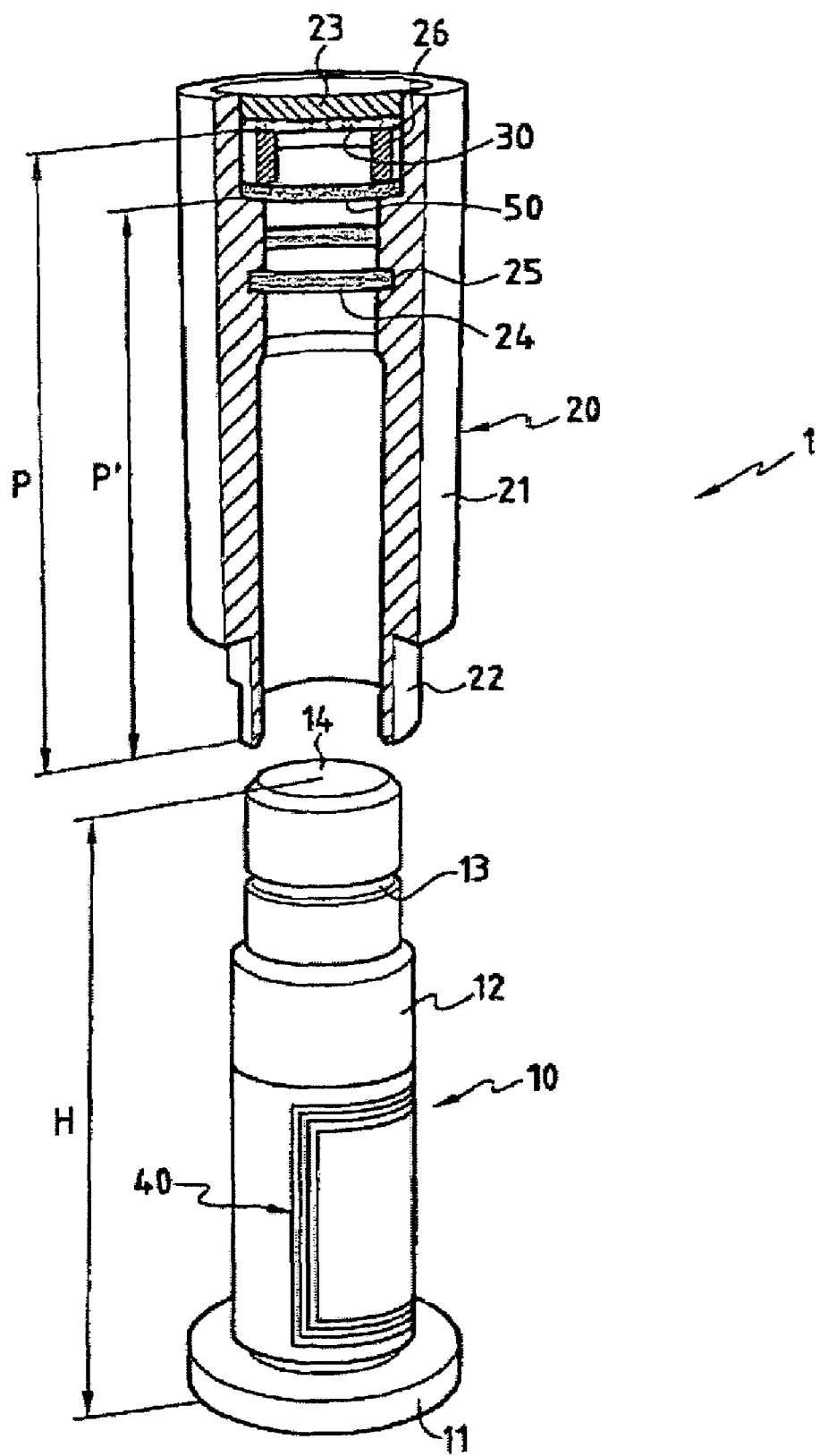
FIG. 1 is a view in perspective of a seal device according to one embodiment of the invention.

FIG. 1 shows the seal device 1 according to the invention. The device 1 is formed of a locking pin 10, and a sleeve 20 intended to be locked onto the pin 10. The pin 10 and the sleeve 20 form a single-use self-locking mechanical system that is used to mark the closure of any object. For this purpose, the pin 10 comprises a head 11 and a stem 12, the stem 12 comprising a locking groove 13 which interacts with a locking ring 24 held inside the sleeve 20 by means of a recess 25 that is made in the body 21 of the sleeve. Thus, as illustrated in FIG. 2, when the stem 12 of the pin 10 is inserted into the sleeve 20, the latter is locked onto the stem by means of the portion of the ring 24 extending beyond the recess 25 which then engages in the groove 13 to hold the sleeve on the stem.

Figure 2:
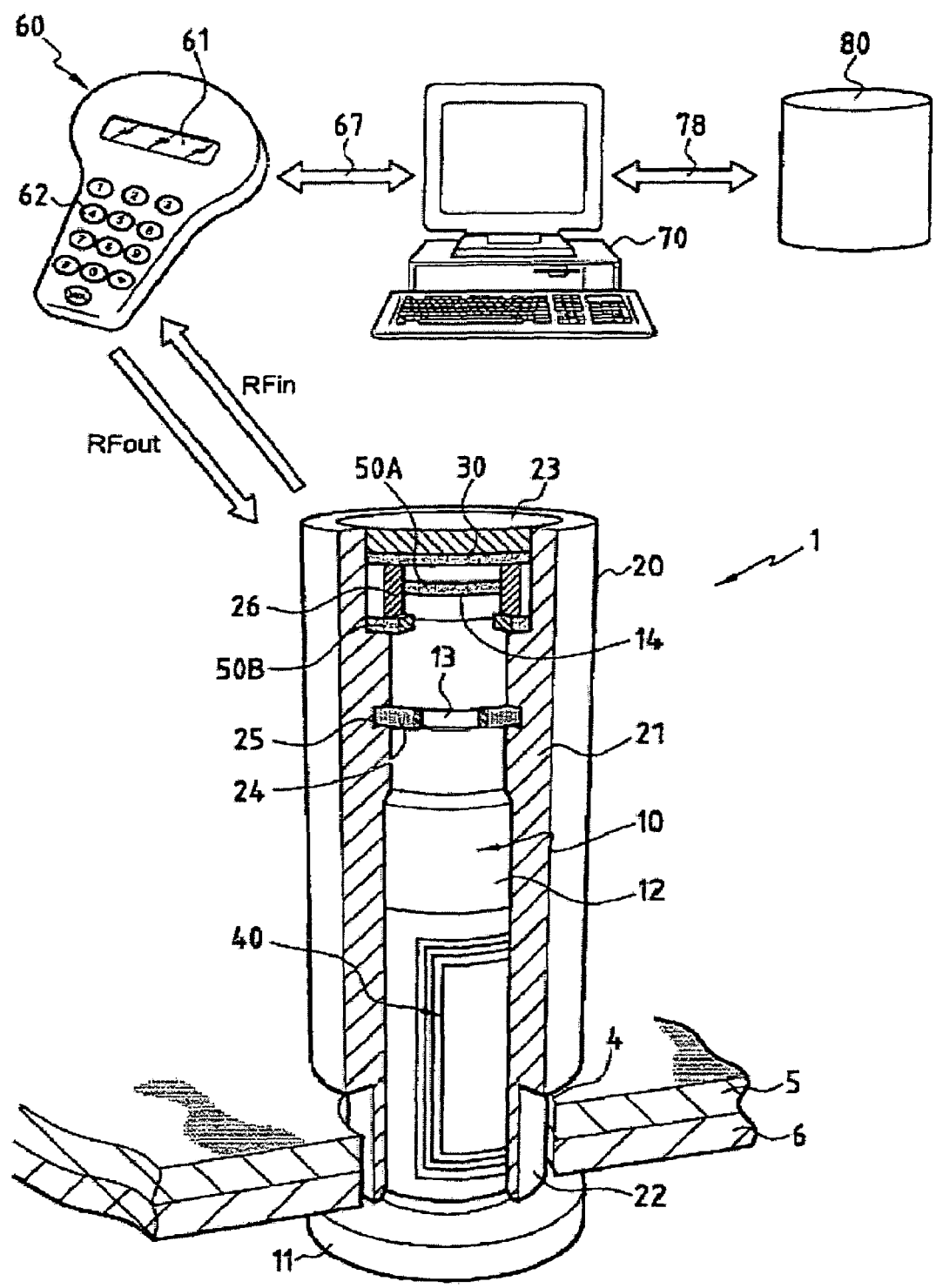
FIG. 2 is a schematic view of a seal device in locked position and of an interrogation and processing system according to the invention.
Figure 4:
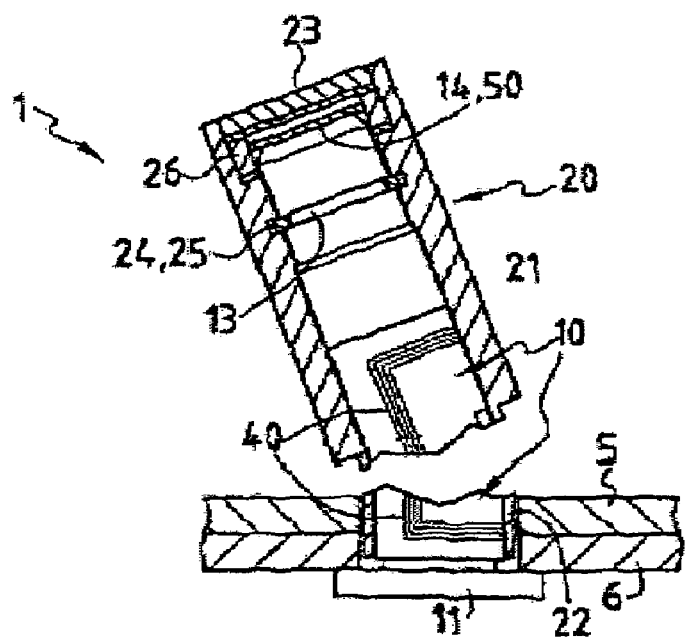
FIG. 4 is a schematic view in section showing the seal device during the opening of an object marked with the device.

For example, as illustrated in FIG. 2, the device 1 may be used for marking the closure of an object by installing the closure system for the object on two elements 5 and 6 in which a hole 4 has been made. The pin 10 is inserted into the hole 4 and held by the head 11 which has dimensions greater than those of the hole 4. Then, the sleeve 20 is placed on the stem 12 of the pin, which is used to lock the elements 5 and 6 together. In order to make the device easier to install, the body 21 of the sleeve 20 may comprise a portion 22 adjusted to the dimensions of the hole 4. Consequently, once the seal device 1 has been installed, the object will not be able to be opened without cutting or breaking the device 1 (FIG. 4).

The seal device according to the invention comprises several electronic components of the transponder type. A first transponder 30 is used as a permanent means of storing information relating to the seal device and to the object with which it is associated. The nature of this information and its use will be described in detail hereinafter. Since the transponder 30 is a permanent transponder, it is disposed in a portion of the device in which it will be protected from any damage. For example, as illustrated in FIG. 1, the transponder 30 is housed in the top portion of the sleeve 20 at a depth P that is greater than the height H of the stem 12 which corresponds to the maximum penetration distance of the stem into the sleeve. The transponder 30 is held against a cap 23 which closes off the top portion of the body 21 of the sleeve 20. The transponder 30 may be bonded onto the cap 23.

A second transponder 40 is disposed on the periphery of the stem 12 of the pin 10. The transponder 40 may be bonded onto the stem 12 to hold it in place on the latter.

Finally, a third transponder 50 is held inside the sleeve 20 at an intermediate depth P', less than the height H of the stem, by a clamp ring 26 placed between the transponder 50 and the transponder 30.

Figure 3:
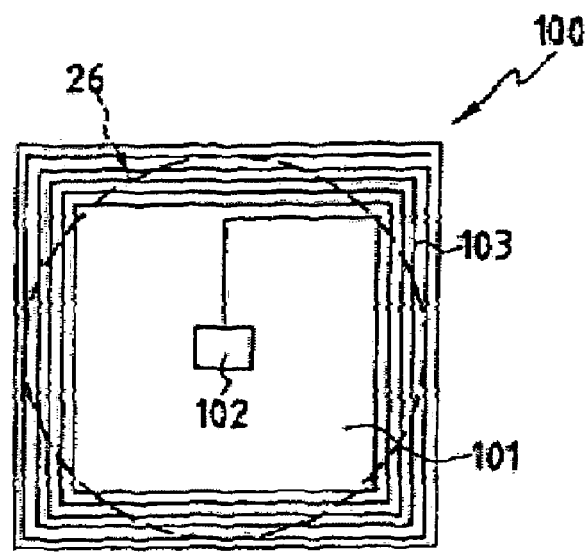
FIG. 3 is a schematic view of the type of transponder used in the seal device of the invention.

FIG. 3 illustrates the general structure of the transponders 30, 40 and 50 that are used in the present invention. As shown in FIG. 3, a transponder 100 is formed of a substrate 101 onto which are placed an electronic chip 102 and an antenna 103. The antenna 103 is formed by a winding which extends all around the periphery of the substrate. One end of this winding is connected to the chip 102. The chip 102 mainly comprises an electronic circuit for storing data which can be accessed in read and write mode as necessary. Each transponder contains at source a unique permanent code which constitutes the identity of the transponder and which cannot be modified.

The data in the memory circuit is read, and where necessary written, by radio frequency transmission thanks in particular to the antenna 103. If the winding that constitutes the antenna 103 is broken, the latter becomes inoperative and transmission between the chip 102 and the outside can no longer be achieved, thus providing evidence that the component 100 has been damaged.

The transponder model described is of the passive type, that is to say that the antenna is used not only for data transmission but also for receiving an activation field for supplying the electronic circuit of the chip with electrical power. It is also possible to use transponders that comprise their own means of supply, such as a battery, the latter being connected to the chip 102 to supply it with power.

The type of transponder described above is particularly suitable for the present invention. Specifically, such components have a very small space requirement which makes it possible to house them easily in seal devices such as that of the invention. In addition, the substrate of the component being made of a fragile material such as silicon, it may be easily broken and thus allow the component or at least the antenna of the latter to be broken with little resistance. However, depending on its function in the device of the invention, the shape, the dimensions and the material of the substrate may be adapted as described hereinafter. For example, for the substrate of the transponder 40 that is intended to be placed on the periphery of the stem 12, preference is given to choosing a flexible material which makes it easier to install the transponder on the stem. In addition, the transponder shown in FIG. 3 has a square shape. However, with respect to the transponders 30 and 50 in particular, the latter may also have a circular shape to make them easier to integrate into the sleeve.

A more detailed description will now be given of the various functions of the transponders that are used in the seal device of the invention.

The permanent transponder 30 is used for storing all the pertinent information that will make it possible to identify the object whose closure has been marked with the seal device of the invention. As an example, the object in question may be a container intended to transport an item of merchandise. In this case, the information stored in the transponder 30 may correspond to the date and location of loading and closure of the container, to the nature of the merchandise transported, to the various customs inspections carried out, to the names or the identification of the parties responsible for these inspections, etc.

The transponder 40 that is placed on the stem 12 of the pin 10 is used as evidence of the integrity of the seal device. Specifically, as illustrated in FIG. 4, any attempt to open the sealed object causes the breakage of the seal device 1 and of the transponder 40 which can consequently no longer be interrogated. To attempt to hide an unauthorized opening, two solutions may be envisaged. The first consists in repairing the cut stem and repositioning it in the seal device. The second solution consists in entirely replacing the seal device with a new one. In both cases, the unauthorized handling can be detected. Specifically, in the first case, in addition to the traces on the sleeve that may provide evidence of such handling, the fraudulent handling will be detected at the time of the next interrogation which will reveal that the transponder 40 does not respond and that, consequently, the seal device has been violated. In the second case, in which the device has been entirely replaced, the read operation will reveal that the transponder identification code has changed and that it does not correspond to that entered on departure.

An explanation will now be given of the role of the third transponder 50 of the seal device of the invention. The transponder 50 is used as evidence of the correct installation of the seal device. Specifically, as illustrated in FIG. 1, the transponder 50 is kept inside the sleeve 20 at a depth P' that is less than the height H of the stem 12 of the pin 10 corresponding to the penetration distance of the stem in the sleeve. Consequently, as illustrated in FIG. 5A, when the sleeve 20 is placed on the pin 10, the end 14 of the stem 12 will come to butt against the transponder 50. Consequently, to bring the sleeve to its final position, that is to say to the position in which the ring 24 is locked in the groove 13 of the stem, it will be necessary to break the transponder 50. More precisely, with reference to FIGS. 2 and 5B, when the seal device has been correctly installed, the transponder 50 is in two pieces 50A and 50B. The piece 50A corresponds to the portion of the transponder that has been detached by the stem 12 while the piece 50B corresponds to the portion that is held between the body of the sleeve 21 and the clamp ring 26. It is necessary to ensure that the clamp ring 26 which holds the piece 50A of the transponder 50 covers at least a sufficient portion of the transponder to ensure that the transponder is destroyed. As shown in FIG. 3, the clamp ring 26 covers at least a portion of the antenna 103 to ensure that the latter breaks when the device is installed.

Therefore, so long as the transponder 50 responds to a remote interrogation, it means that it is intact and that the sleeve is not correctly positioned on the pin.

Data may be read from and/or entered in the transponders for example with the aid of a radio frequency transmission device 60 shown in FIG. 2. The transmission between the device 60 and the transponders is carried out by radio frequency signals RFin and RFout which correspond respectively to the signals received and the signals sent by the device 60. Thus, with the device 60, it is possible to read and/or write in the memory of the transponders.

As an example, the device 60 may be a portable reader that can be used to read and write data in a transponder. Such a reader comprises a display screen 61, a keypad 62 and/or means of storing the interrogated data. The reader drives the transponder by radio frequency (RF), for example at a frequency of 13.56 MHz. This wave charges a capacitor present in the circuit of the transponder. When the latter discharges, it sends the reader a code or an item of information written in the memory of the transponder. This type of portable reader can be used to interchange data with the transponders over a distance of approximately 30 cm. Alternatively, it is possible to use various types of non-portable readers which have antenna geometries allowing a serial read/write operation at a greater distance.

The code and/or the information of each interrogated transponder is thus sent to the device 60. In the case of a portable reader, these data may be displayed on its screen 61 and/or stored in its memory. The device 60 may also comprise integrated processing means specially programmed to carry out the inspections described here.

Alternatively, the processing means, such as a computer 70, may be used to process the data from the transponders. In this case, as illustrated in FIG. 2, the computer is connected to the device 60, via a serial link 67, so that it can interchange data with each transponder memory. In any case, the processing means comprise and run software that can be used to perform all kinds of inspection and monitoring functions based on the data of the transponders.

For example, depending on the case, the device 60 or the computer 70 may comprise software means for inspection, at the start, the installation of the device by interrogating the transponder 50. The information concerning breakage of the transponder 50, which is therefore evidence that the seal device has been correctly installed, may be used as starting information by the processing means in order, for example, to store the identification codes of one or more transponders for the purposes of future inspections. The software may also be used to establish the correlation between the identification number of one of the transponders and various data such as the location and/or the name of the inspector who installed the seal device, and/or the date on which the latter was installed. The software may also be used to write or update data in the transponders (except for the identification code which cannot be modified).

Information, such as the identification codes, may be stored in a database 80 (FIG. 2) which may be accessed on line, via a network link 78 such as an Internet link for example. The transmission device 60, the computer 70 and the database 80 constitute a system that can be used to inspect and monitor in real time any object that is marked by one or more seal devices of the invention. This can be used to monitor and inspect the merchandise throughout its journey. The integrity of the device may be checked at any time. Specifically, the interrogation of the transponder 40 can be used to determine initially whether the latter is intact and, where appropriate, to compare the code read in the latter with the code originally entered in the database 80 which may be accessed remotely via the network link 78.

Finally, the permanent transponder 30, which may contain all sorts of information that is added to during the stages of the object's transportation, thus builds up the history of the seal device which may be consulted in real time by interrogating the transponder 30 at an inspection location.

According to the principle of the seal, the latter may be affixed only once without harming its integrity. The seal device according to the invention satisfies the same requirements. It may have many applications. As shown in FIG. 6, a plurality of devices 1 are used to mark the closure of a cover 2 on an enclosure 3. In this case, the elements 5 and 6 correspond to collars in which through-holes of the devices 1 have been made. The integrity of the system thus formed is guaranteed and may be easily inspected as described hereinabove.

The seal according to the invention has the following advantages.

It allows a secure identification for each object to which it is affixed.

The installation of the seal device may be validated by interrogation of a transponder.

The sealed object and its merchandise may be monitored throughout the journey by interrogation of the transponders and transmission of the information. Specifically, the information, such as the identification codes, may be read as many times as necessary since this is done without removing or damaging the seal device and, consequently, without harming its integrity.

The integrity of the device may be inspected at any location, either directly when the transponder does not respond, or by comparison with the identification code or codes read on site and compared with those originally entered in a database that can be accessed on line when the device has been replaced without authorization. It is then possible, by analyzing the data entered in the permanent transponder, to determine, where necessary, the person responsible, the location and the date of the unauthorized handling.

When the transponder circuit comprises programmable or encryptable means, it is possible to encode or encrypt the data stored in the seal, thereby providing an enhanced level of security.

The seal device has a low production cost.

The seal device has a good mechanical strength which means that it can be used with objects being transported such as containers that are often handled without particular care.

The invention claimed is:

1. A seal device, comprising a locking pin and a sleeve, said locking pin comprising a head and a stem comprising means to lock said sleeve onto the pin wherein said sleeve also comprises a first transponder housed in the upper portion of said sleeve at a depth P that is greater than a height H of said stem and in that said locking pin also comprises a second transponder disposed on the outer periphery of said stem, each transponder comprising a substrate on which are formed an electronic circuit and an antenna, said electronic circuit comprising storage means for storing at least one unique identification code, wherein said second transponder is configured and disposed in such a way as to cause rupture of the electronic circuit or the antenna of the second transponder when an attempt is made to open the seal device.

2. The device as claimed in claim 1, wherein said means to lock said sleeve onto said pin comprises a groove on said stem and a locking ring on said sleeve, said groove interacting with said locking ring to lock said sleeve onto said pin by insertion.

3. The device as claimed in claim 1, wherein said sleeve further comprises a third transponder held inside the latter at a depth P' that is less than said height H of said stem, said third transponder comprising a substrate on which are formed an electronic circuit and an antenna, said electronic circuit comprising storage means for storing at least one unique identification code.

4. The device as claimed in claim 3, wherein said third transponder is held in said sleeve by an annular element which covers at least a portion of said antenna of said transponder.

5. The device as claimed in claim 1, wherein said storage means of said first transponder contain data relating to date and location at which said seal device was installed.

6. The device as claimed in claim 1, wherein said storage means of said first transponder comprises data encryption means.

7. A system of inspecting and monitoring an object, said object comprising at least one seal device according to claim 1, wherein it comprises a signal transmission device to read or write information in said transponders of said seal device, processing means and data storage means for recording information stored in said transponders.

8. The system as claimed in claim 7, wherein said data storage means are remotely accessible via a network link.

9. The system as claimed in claim 7, wherein said sleeve further comprises a third transponder held inside the latter at a depth P' that is less than said height H of said stem, said third transponder comprising a substrate on which are formed an electronic circuit and an antenna said electronic circuit comprising storage means for storing at least one unique identification code, wherein said processing means comprise software means for confirming installation of said seal device by interrogation of said third transponder.

10. The system as claimed in claim 7, wherein said processing means comprise software means for detecting unauthorized handling of said seal device by interrogating said second transponder.

11. The system as claimed in claim 7, wherein said processing means comprise software means for detecting unauthorized replacement of said seal device by reading transponder codes of said seal device and by comparing said transponder codes with transponder codes previously recorded in said data storage means.

12. A seal device, comprising a locking pin and a sleeve, said locking pin comprising a head and a stem comprising a groove which interacts with a locking ring disposed in said sleeve to lock said sleeve onto said pin by insertion, wherein said sleeve also comprises a first transponder housed in the upper portion of said sleeve at a depth that is greater than the height of said stem and in that said locking pin also comprises a second transponder disposed on the outer periphery of said stem, each transponder comprising a substrate on which are formed an electronic circuit and an antenna, said electronic circuit comprising storage means for storing at least one unique identification code, wherein said second transponder is configured and disposed in such a way as to cause rupture of the electronic circuit or the antenna of the second transponder when an attempt is made to open the seal device.

* * * * *